![UNITED STATES PATENT OFFICE.

GÉZA AUSTERWEIL, OF NEUILLY, NEAR PARIS, FRANCE.

PROCESS OF OXIDIZING BORNEOL TO CAMPHOR.

979,247. Specification of Letters Patent. Patented Dec. 20, 1910.
No Drawing. Application filed December 8, 1908. Serial No. 466,562.

*To all whom it may concern:*

Be it known that I, GÉZA AUSTERWEIL, a subject of the King of Austria-Hungary, residing at Neuilly, near Paris, in the Republic of France, have invented a certain new and useful Process of Oxidizing Borneol to Camphor, of which the following is a specification.

The conversion of borneols into camphor by oxidation with nitric acid is known. This method has in practice been generally adopted. A mixture of fuming and concentrated (40° Bé.) nitric acid has also long ago been proposed as the oxidation medium. In this process the use of fuming nitric acid is troublesome. The following process may be employed for avoiding this drawback.

Air or oxygen is blown into a suitable mixture of borneols and isoborneols and more or less concentrated nitric acid (preferably one part of borneol or isoborneol to 1½ or two parts of nitric acid at 37°–40° Bé.) after the addition of small quantities of vanadic acid, or of vanadium pentoxid or vanadic salts, such as sodium vanadate for instance, the mixture being maintained at a temperature from 35° to 60° C., and the heating preferably taking place under a reflux condenser. The time of blowing in oxygen is limited by the complete conversion of borneol into camphor; it is of two hours for one kilogram of borneol, and changes with the amount of borneol entering into reaction. The process may also be employed with advantage in mixtures of borneols and isofenchyl-alcohols, the isofenchyl-alcohol in the presence of vanadic acid being regularly oxidized to fenchon. (Fenchon from a physical as well as a chemical point of view is, however, extremely closely allied to camphor and may be employed without disadvantage in the manufacture of celluloid.) The oily liquid is separated partly from time to time, and added to a solution of alkaline reaction, a carbonate for instance. Then the camphor is driven away with steam, and refined in the usual manner. The camphor may also be precipitated by pouring the oily liquid into an alkali.

Example: 1 kilogram of borneol is put by little quantities into 1½ kilograms of nitric acid of 37° to 38° Beaumé. The temperature is maintained between 35° and 45° C. 2 centigrams of ammoniummetavanadate are added to the acid. Then, from time to time some part of the resulting oily liquid is poured into alkali, and the camphor driven off with steam. To the remaining mixture of acid and the oily liquid, some fresh borneol is added and the process carried on in the described manner.

The process may also be modified by adding borneols or isoborneols to an anode of vanadium pentoxid or its compounds, using nitric acid or nitrates as an electrolyte and simultaneously blowing air through the anode chamber. This process, however, is not specifically claimed herein, being claimed in a separate application for patent.

Having now particularly described the nature of my said invention and in what manner the same is to be performed, I declare that what I claim is:—

The process of converting borneols and isoborneols into camphor which consists in oxidizing them by treatment with a reagent comprising vanadic acid in presence of nitric acid and blowing oxygen through the mass.

In witness whereof, I subscribe my signature, in presence of two witnesses.

GÉZA AUSTERWEIL.

Witnesses:
ALBERT GRÜNFELD,
MAX HERZENBERG.